US006733293B2

(12) United States Patent
Baker et al.

(10) Patent No.: US 6,733,293 B2
(45) Date of Patent: May 11, 2004

(54) PERSONAL SIMULATOR

(75) Inventors: Edward-Bruce Baker, Altamonte Springs, FL (US); Michael K. Forster, White Hall, MD (US); Jeffrey L. Vrachan, Agoura Hills, CA (US); Curtis L. Thornton, Simi Valley, CA (US)

(73) Assignee: Provision Entertainment, Inc., Chatsworth, CA (US)

( * ) Notice: Subject to any disclaimer, the term of this patent is extended or adjusted under 35 U.S.C. 154(b) by 0 days.

(21) Appl. No.: 10/057,483

(22) Filed: Jan. 25, 2002

(65) Prior Publication Data

US 2002/0115043 A1 Aug. 22, 2002

Related U.S. Application Data

(60) Provisional application No. 60/264,610, filed on Jan. 26, 2001.

(51) Int. Cl.[7] .............................................. G09B 19/16
(52) U.S. Cl. ........................ 434/55; 472/60; 472/130
(58) Field of Search ............................. 434/29, 30, 51, 434/55, 58, 59, 61, 62; 472/57, 59, 60, 83, 130, 134

(56) References Cited

U.S. PATENT DOCUMENTS

| | | | | | |
|---|---|---|---|---|---|
| 2,661,954 A | * | 12/1953 | Koci | .......................... | 463/57 |
| 3,628,829 A | * | 12/1971 | Heilig | ...................... | 297/217.4 |
| 4,398,241 A | | 8/1982 | Baker et al. | | |
| 4,584,896 A | * | 4/1986 | Letovsky | ................... | 74/490.1 |
| 5,496,220 A | * | 3/1996 | Engstrand | ..................... | 472/60 |
| 5,605,462 A | * | 2/1997 | Denne | .......................... | 434/55 |
| 5,711,670 A | * | 1/1998 | Barr | ............................. | 434/55 |
| 5,954,508 A | * | 9/1999 | Lo et al. | ........................ | 434/55 |
| 6,162,058 A | * | 12/2000 | Yang | ............................ | 434/55 |
| 6,210,164 B1 | | 4/2001 | Otto | | |
| 6,283,757 B1 | | 9/2001 | Meghnot et al. | | |
| 6,445,960 B1 | * | 9/2002 | Borta | .......................... | 700/28 |

* cited by examiner

*Primary Examiner*—Kien T. Nguyen
(74) *Attorney, Agent, or Firm*—Craig E. Shinners

(57) ABSTRACT

A reliable, cost effective motion simulator system wherein a motion platform controlled by three inexpensive fractional horsepower induction AC motors to provide n-axis of motion where n is two, three, four, five or six. A dynamic boost is applied to maintain the position of the motion platform at low speed or zero speed and to handle transient motion demands without use of an encoder. The personal simulator motion base includes a support structure for positioning a rider coupled to the motion platform. A support pedestal and a plurality of linkages support the motion platform. A plurality of motor assemblies 114 is coupled to the motion plate by the linkages. A control algorithm enables the use of low cost power electronics to drive the AC motor-linkage assemblies. The personal simulator may be controlled in response to user-initiated commands, remote-user initiated commands or by commands embedded in game software or the audio track of a video stream.

37 Claims, 9 Drawing Sheets

PERSONAL SIMULATOR

CROSS REFERENCES TO RELATED APPLICATION

This application claims is related to U.S. Provisional Patent Application Serial No. 60/264,610 filed Jan. 26, 2001, the disclosure of which is incorporated herein by reference in its entirety for all purposes.

FIELD OF THE INVENTION

The present invention relates to a motion simulator system and more particularly, to a compact, reliable and inexpensive single-person motion simulator system.

BACKGROUND OF THE INVENTION

Prior art motion simulator systems are typically large electromechanical systems to which one or more persons are positioned to experience motion in concert with a displayed image. The portion of the system devoted to generating motion, the motion simulator, includes a motion base moves in response to motion control commands provided from a computer or embedded in the video signal. When a person is positioned on the motion base, the person is moved while viewing visual and audio stimuli. This combination of motion, visual and auditory sensation generates a very realistic physical sensation that is far superior to merely seeing and hearing the audio/visual presentation. For this reason, motion simulator systems are widely used for military and commercial training applications. For examples, pilots are often trained in a motion simulator rather than in the aircraft and military tank crews are provided with a simulator that appears to the occupants to be a tank that rumbles across a variety of terrain. Unfortunately, due to the expense of these motion simulator systems, use is generally limited to military and commercial training applications. Further, the weight and complexity of the mechanical portion of such simulators preclude any use in a home or similar environment.

The motion simulator is also well suited for entertainment applications where motion adds a very real physical sensation to an otherwise audio/visual experience. Although a motion simulator system is often viewed as an enhancement to a viewing experience, relatively few such systems are found in entertainment complexes such as movie theaters or video arcades because of the complexity and high cost of prior art motion simulator system.

By way of example, a typical prior art motion simulator system can cost more than $125,000 primarily because motion is supplied by an expensive hydraulic mechanism. Substantial additional costs are also incurred to maintain the system. Motion simulators for arcade applications are somewhat less expensive because motion is obtained from several servo motors coupled to the motion base. In some applications, up to eight such servo motors are required. Unfortunately, servo motors are heavy and relatively expensive so the typical motion simulators in an arcade can cost up to about $50,000. Due to the high acquisition price there is only a limited market for arcade-style motion simulator systems. It should be apparent that regardless of the application, a substantial portion of the cost of the above described motion simulator systems resides in the mechanism that drives the motion base. Further, the high cost renders it impractical to use prior art motion simulator systems in the home or similar environment.

Another drawback of prior art motion simulator systems resides in the weight of the system and power requirements (that is 220 VAC, and possibly 3-phase) to drive the motion base. These parameters render motion simulator systems unfit for home use. What is needed is a lightweight motion simulator system that is inexpensive but that is well suited for use in the home or similar environment. However, since safety of the user is required, a lightweight motion simulator must also be sufficiently stable without relying on the heavy servo and gearbox combination of the prior art.

Clearly, with the advent of Internet gaming, the addition of motion would enhance the gaming experience for the home user. With a safe, low cost, lightweight motion simulator system, the gaming experience at home would approach the environment found in military or commercial training or high-end arcade applications. What is needed is an inexpensive and reliable motion simulator that is adapted for use in a home or similar environment that can be easily coupled to a home computer or other entertainment device, such as the television or stereo.

SUMMARY OF THE INVENTION

The present invention is a reliable, lightweight, low cost motion simulator system that is well suited for the home environment. The motion simulator system includes a television, computer display or other display devices to provide the physical sensation of motion together with the audio/visual viewing experience. In one preferred embodiment of the present invention, the motion simulator includes a motion base mounted on a base plate. A chair or similar supporting structure is coupled to the motion base. A controller, adapted to receiving motion commands, generates signals for controlling the motion base. In response to motion commands, the motion base is activated so that a person in the support structure experiences motion synchronized with the displayed audio visual display.

The motion base is controlled by at least two inexpensive induction motors, each of which drives a crank and pushrod assembly, the other end of which is coupled to the motion base. The left and right motors are used together to give the motion platform roll. To roll right, the left motor crank is turned up, and the right motor crank is turned down. For pitch, the left and right motors are driven in the same direction, and the rear motor is driven in the opposite direction from the other two. When the left and right motor cranks are turned up, and the aft motor crank is turned down, the moving platform will pitch up. An innovative control algorithm enables the use of low cost power electronics and control chips, typically used for fan and pump applications where only crude speed control is required, to drive the motors.

DETAILED DESCRIPTION

According to the principles of the present invention, a new, efficient personal motion simulator system is disclosed. The present invention provides a system that provides motion to a rider synchronized with either audio or a video display. In the following description, numerous specific details are set forth in order to provide one skilled in the art an understanding of the present invention. However, it will be apparent to one of ordinary skill in the art that these specific details need not be used to practice the present invention. In other instances, well known structures, circuits and interfaces have not been shown in detail in order to avoid unnecessarily obscuring the present invention.

Figure 1:
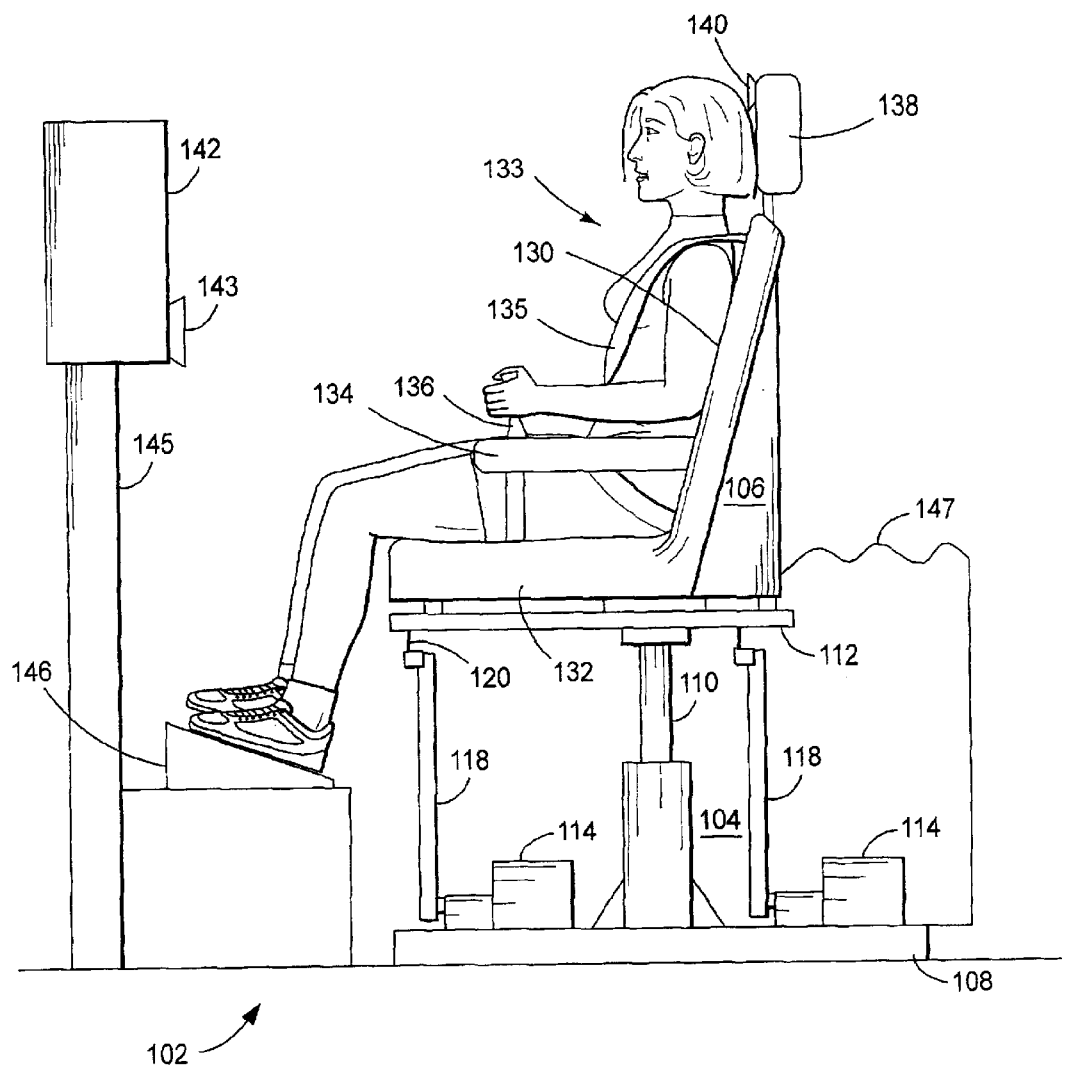
FIG. 1 illustrates one embodiment of a personal simulator in accordance with the invention.

With reference now to FIG. 1, a block diagram of a personal simulator system 102 of the present invention is illustrated. In the illustrated embodiment, personal simulator system 102 comprises a motion base 104 and a support structure 106 such as a chair. Motion base 104 provides three-axis of motion to support structure 106 although it will be apparent to one skilled in the art the following description is applicable to personal simulators having two-axis of motion (2-dof), four-axis of motion (4-dof), five-axis of motion (5-dof) and six-axis motion (6-dof) bases. To illustrate, two motors would control the motion base if the personal simulator system were a two-axis motion base. In general, the base must have one motor assembly (and related controls) per axis.

For the illustrated three-axis motion base, motion base 104 comprises a support plate 108, support pedestal 110, a motion plate 112 and a three motor assemblies 114 mounted on support plate 108 coupled to the motion plate by linkages 118. The support plate 108 provides stability to personal simulator system 102 as support structure 106 is moved through its full range of motion even when a rider 133 is seated or otherwise coupled to the support structure. Depending on the application, support plate 108 consists of a sheet of metal having a thickness of between about 0.7 cm to 1.2 cm. Support plate 108 may be either aluminum or steel with steel preferred. Support plate 108 has a length (front to rear) of about 75 cm (approximately 30 inches) and a width of about 54 cm (approximately 20 inches). With these dimensions, personal simulator system 102 has a capacity of about 300 pounds. Other geometric shapes, such as circular, or a pattern of radiating arms may be used for support plate 108 so long as sufficient stability is provided. If the center of gravity (COG) of the rider is positioned higher above the support plate, such as when the rider is standing, then a wider, heavier support plate must be provided. The weight limitation for the rider is due in part to the length of the linkages, the moment arm associated with the riders COG above the support plate and the overall dimensions of support plate 108. It should be apparent that the weight capacity of the present personal simulator system 102 is sufficient to support a single adult rider. Increasing the dimensions of support plate 108 or adding additional weight can help to prevent the personal simulator system 102 from tipping over. For example, if a lightweight aluminum support plate 108 included a chamber, a fluid, such as water, could provide the necessary counter ballast to compensate for a heavier rider. Similarly, adding additional weight to the corners of support plate 108 could increase the capacity of personal simulator system 102.

Support pedestal 110 is rigidly attached to support plate 108. Rigidity is enhanced by welding a plurality of gussets along the lower length of pedestal 110 and to the support plate 108. The end portion of support pedestal 110 extends through a hole in support plate 108 (not shown) that conforms to the dimensions of the support pedestal 110. A weld bead around the periphery of support pedestal 110 welds support pedestal to support plate 108 to prevent rotation and to maintain the relationship of the pedestal to the support plate. If material other than steel is used for the support plate, the pedestal may be bolted or otherwise permanently attached to the support plate 108. Support pedestal 110 extends upward from support plate 108 for a distance of between 15 to 18 inches, with the actual height being dependent on the desired height of support structure 106 above support plate 108. It is preferred that the height of support pedestal is less than or equal to the width of the support plate 108. Support pedestal 110 has a slip or sliding spine shaft and a coupling mechanism for attaching to support plate 112. In the embodiment shown in FIG. 2, the attachment mechanism is a universal joint 228 that is bolted to the support plate 112. Support pedestal 110 is positioned to the center of motion plate 112 and equal distance from either side of support plate 108. In the preferred embodiment, the support pedestal 110 is toward the front of support plate 108. More specifically, in one embodiment, the center of support pedestal 110 is about 21.6 centimeters from the leading edge of support plate 108. In general, the attachment point of the support pedestal is offset from the front edge of the support plate by a distance that is between 28.5% and 37.0% of the overall length of the support plate 108.

The moving plate is constrained in x, y, and yaw by the center post, u-joint and sliding spline. The sliding spline prevents the moving plate from rotating in yaw, but allows it to move up and down in heave. The U-joint allows the moving platform to move in roll and pitch while constraining it in x (fore and aft or surge) motion and y (side to side or sway) motion. X is a linear motion fore and aft, while pitch is a fore and aft movement in rotation. Similarly, y is a linear motion side to side, while roll is a rotational motion side to side. In comparison, an object like an aircraft is free to move in six degrees of freedom: x, y, z, roll, pitch, and yaw. Thus, the illustrated embodiment discloses a three axis motion base for use as a personal simulator that is an inexpensive solution for many motion applications.

Three motor assemblies 114 are mounted on support plate. Each motor assembly 114 controls one axis of motion in personal simulator system 102. A crank and pushrod or drive-arm linkage 118 couples each motor assembly 114 to motion plate 112. Each drive arm linkage 118 connects to a flange 120 extending downward from the bottom side of motion plate 112.

Support structure 106 is attached to the top surface of motion plate 112, its primary purpose being to hold up or support the rider as motion plate moves. In one preferred embodiment, support structure 106 supports the rider in a seated position and comprises a chair where the rider is seated with their legs extending downward towards support plate 108. In this embodiment, a chair is bolted or welded to motion plate 112. The bottom of the chair includes a U-shaped base portion attached to motion base 112 by bolts or welding. Inside of the U-shaped channel is an adjustable mechanism so that the chair can be slid forward or backward to fit the user similar to the mechanism found in a front seat of an automobile. The chair may include a back support 130, a seat 132, and an arm support 134. The chair may be a molded plastic seat where the back portion 130 and seat portion 132 are integrated with arm support 134. In another embodiment, seat portion 134 may be separate from back portion 130 or the support structure 106 may not include an arm support 134. In another embodiment, the rider stands on support structure 106 and holds on to a bar or other devices adapted to maintain the rider in alignment with the support structure 106. In yet another embodiment, the rider straddles a saddle as if they were riding a horse or motorcycle. The support structure is oriented so that it places the center of gravity of the rider approximately over the center of gravity of motion plate 112. More specifically, the rider's center of gravity is preferably over the support pedestal.

If the support structure comprises a stand-up plate where the rider either kneels or stands upright on the plate, it is preferably a two-layer device so that mounting screws do not protrude through to the surface exposed to the rider. Alternatively, the mounting screws attaching the support structure to motion plate 112 should be recessed. A non-skid surface (not shown) is then applied to the motion plate so that the rider may resist slipping when the motion plate is canted. In another embodiment, not shown, ski or snowboard bindings may be attached to the support structure to simulate the experience of a skier. It is possible that the rider could exert sufficient pressure to release the bindings and be thrown from the personal simulator system 102. Accordingly, a cushion or air mattress (not shown) may surround personal simulator system 102 to minimize the potential for injury to the rider.

Regardless of the configuration, support structure should be padded and without sharp edges or protrusions that the rider could be thrown against when simulator system 102 is in use. A restraint system, such as a seat belt or harness 135 is also preferably included as a part of support structure 106. Additional safety devices are also preferably included, such as switch under the support structure that requires a minimum weight be applied on the support structure before enabling operation to avoid small children from using the system. Within easy reach of a person seated or otherwise positioned in support structure 106 is a joystick 136 or other similar input control device. It should be clear to one skilled in the art that support structure 106 may include additional joysticks or other control mechanisms, such as a steering wheel, foot pedals, or other control mechanisms specific to a particular application. By way of example, the control mechanism may comprise a pair of video cameras adapted to detect motion of the person and interpret the motion to control the simulator operation. In addition, a "panic button," incorporated into the joystick or other control device, must be pressed at all times for system 102 to operate, otherwise operation is immediately shut-down for safety reasons or, by way of example, if the user feels sick from motion sickness.

In one preferred embodiment, support structure 106 includes a headrest 138 positioned to assist a person seated, standing or kneeling on support structure 106. Headrest 138 includes speakers 140 to broadcast audio signals proximate to the rider to impart audio sensations.

To the front of personal simulator system 102, a display device 142 is positioned at approximately eye level of the rider positioned in support structure 106. Display 142, which may be a computer monitor, a television, a movie screen or other display device, may further include additional speakers 143 and a microphone 144. Although there are many conceivable ways to position display 142, in one embodiment, a stand 145 is used to position the display at approximate eye level. Display 142 could also be positioned on a table or other supporting structure. In other embodiments, display 142 is a movie screen that is separately positioned relative to a plurality of motion bases controlled in parallel. In this configuration, patrons at a movie theater may each experience motion while watching the movie.

In the preferred embodiment, support structure 106 also includes a base enclosure 147 that is positioned underneath the support structure to prevent the clothing, hands or feet of the rider or a bystander from contacting any of the mechanical or electrical elements used to generate the simulated motion. In one preferred embodiment, base enclosure 147 is a semi-rigid plastic molded skirt that allows the rider's legs to dangle to the front of the chair but prevents the rider from kicking their legs backward into drive arm linkage 118. Enclosure 147 may include a footrest 146 to support the feet above floor level. Advantageously, base enclosure 147 also tends to minimize transmission of noise generated by motor assemblies 114.

In operation, the person riding the personal simulator is positioned and secured in support structure 106 prior to initiating a simulation event. A simulation event may be any audiovisual presentation provided by the display source that is enhanced with motion control signals. Once securely positioned in support structure 106, the user may initiate the simulation event by pressing a control switch on joystick 136 or by initiating a verbal start command that is detected by microphone 144. At that time, video signals are displayed on display 142 and audio signals are generated at speakers 140 and 143. Simultaneous with the display of the video signal on display 142, motion base 104 receives motion control signals that are synchronized to the displayed image. These motion control signals are used to position drive arm linkages 118 and to induce motion in motion plate 112. As motion plate 112 is positioned in various orientations, the rider positioned in support structure 106 will be physically re-oriented as dictated by the visual scene on display 142. The sensation of movement is thus provided to enhance the viewing experience. Alternatively, the rider may control the viewing experience by generating control signals such as when playing a video game using a personal computer or dedicated game oriented computers, which are commercially available and widely enjoyed.

Figure 2:
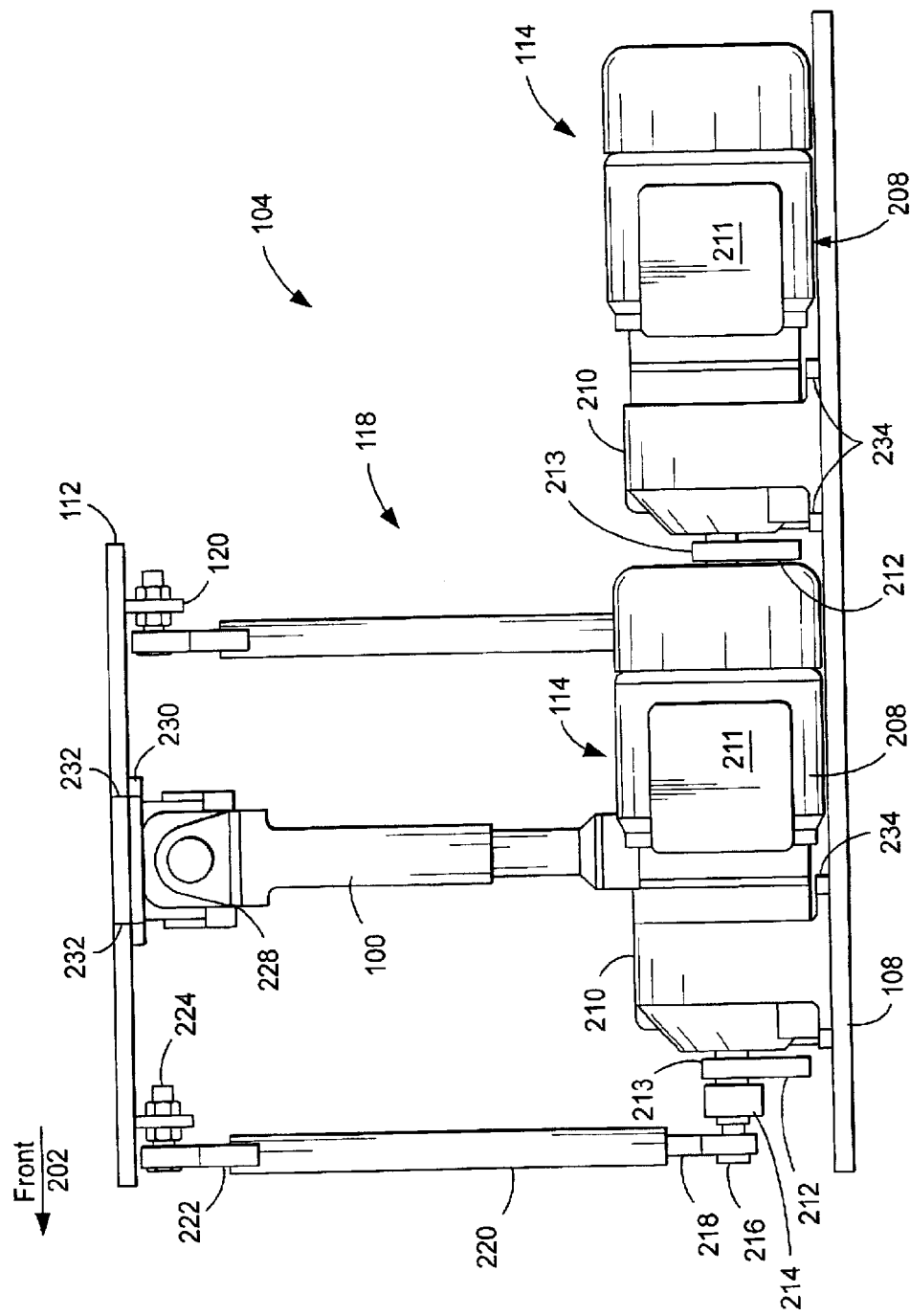
FIG. 2 illustrates a side view of the motion base of the personal simulator in accordance with the present invention.

FIG. 2 illustrates a more detailed side view of motion base 104. In FIG. 2, a front left and rear motor assemblies 114 are shown attached to support plate 108. Again, although only the front left side motor and the rear motor assemblies are shown, it is to be understood that a third motor assembly is required to provide the three axis of motion. In the preferred embodiment, the third motor is positioned toward the front of the support plate 108 adjacent to the front left side motor assembly. In other embodiments, there is a single forward motor and a pair of motors mounted toward the rear of support plate 108. Motor assemblies 114 are attached to support plate 108 by a plurality of bolts 234 although it should be apparent to one skilled in the art that other means for attaching motor assemblies to support plate 108 are known in the art and may be readily incorporated. For example, the motor assemblies 114 could be welded to the support plate, attached by clamps or a combination of such retaining techniques.

Each motor assembly 114 is a commercially available helical geared AC motor assembly comprising an electric motor 208 coupled to a gearbox 210. In one preferred embodiment, motor 208 is a commercial grade three-phase induction fractional horsepower AC motor. Fractional horsepower motors such as a ⅓ horsepower, model number SK172-71S/4 or a ¼ horsepower, model number SK172-63I/4 that include the helical geared output, are commercially available from NORD. Siemens, by way of example, supplies another acceptable fractional horsepower induction motor although its motors do not include an integral gearbox. A controller 211 is attached to each motor to generate the drive voltage required to control the operation of motor 209. Controller 211 receives positional information from an external source such as a game console, the Internet or a local computer, compares the positional information to the current position and drives the motor to properly position or maintain the position of the motion plate 112.

The output of gearbox 210 drives a pulley 212 that in turn drives a belt 213. The pulley is used to monitor motion output of the motor so that the controller can determine when the appropriate position is achieved. Gearbox 210 also drives a crank 214 which is coupled outward of pulley 212. Crank 214 is a rectangular shaped element.

Figure 3:
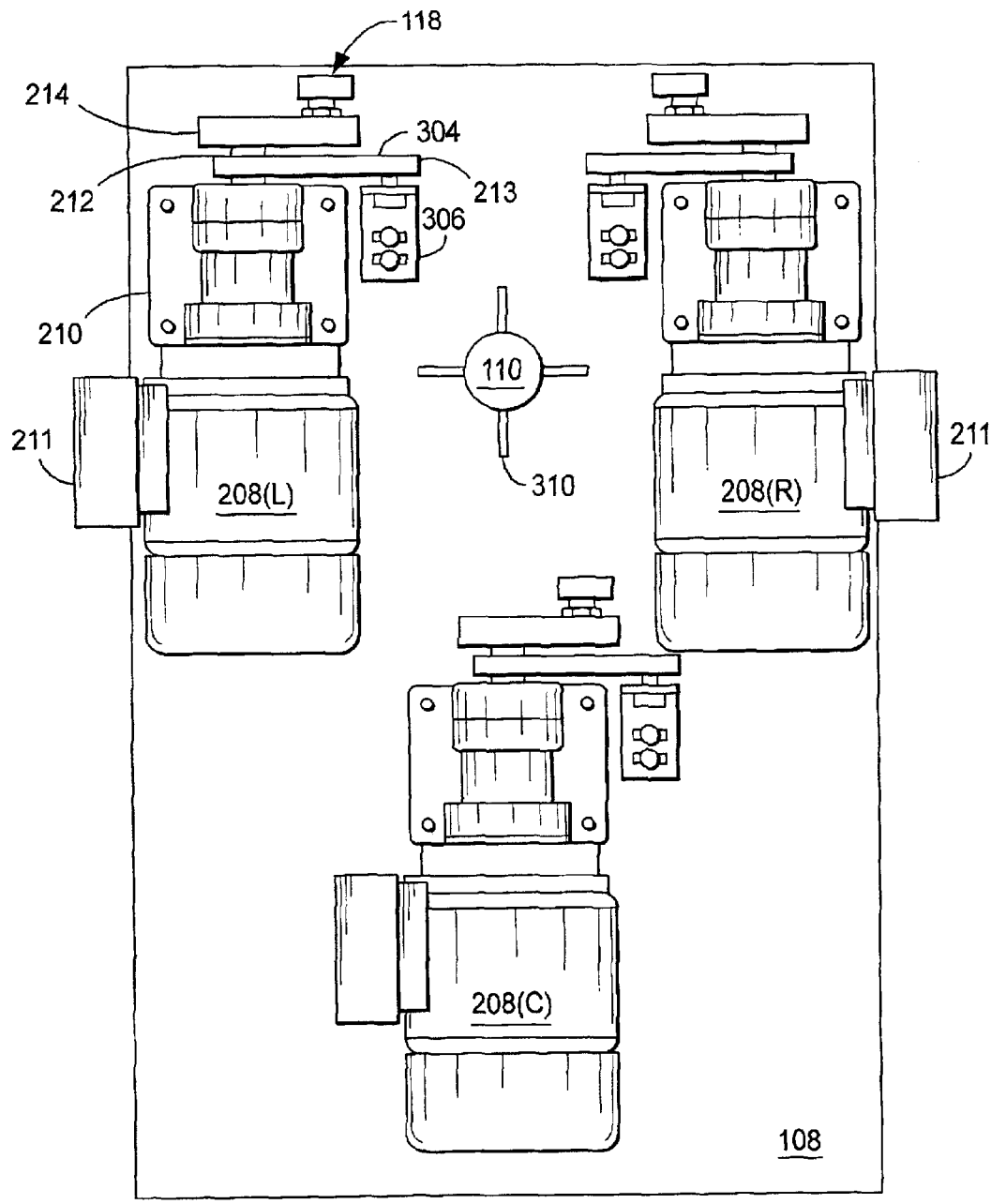
FIG. 3 is a top view of the motion base shown in FIG. 2.

FIG. 3 is top view of support plate 108, with the motion plate 112 removed, illustrating the alignment of each motor 208, gearbox 210, pulley 212, crank 214, and drive arm linkage 118. Crank 214 is coupled at one end to the output shaft of gearbox 210. At the other end of crank 214, drive arm linkage 118 is coupled such that a half rotation of crank 214 from a substantially horizontal to a substantially vertical orientation and back to a horizontal orientation alternately raises and lowers drive arm linkage 118.

Referring again to FIG. 2, drive arm linkage 118 comprises a lower rod end connector 216 that couples drive arm linkage 118 to crank 214. More particularly, drive arm linkage 118 has a lower eyebolt 218 that is terminates in an open eye positioned adjacent to crank 214 and held in place by lower rod end connector 216. The threaded bolt portion of eyebolt 218 extends upward and engages a push rod 220. Push rod 220 is between 35.5 cm and 43.2 cm (approximately 14 and 17 inches) in length and is a substantially cylindrical or I-beam element. Push rod also has a screw thread for engaging a second or upper eyebolt 222 at an end opposite from eyebolt 218. Eyebolt 222 engages an upper rod end connector 224 that is coupled to a downwardly extending flange 120. In this manner, motion plate 112 is coupled at three positions to the motor assemblies 114 by linkages 118.

The upper portion of support pedestal 110 includes a coupling mechanism for attaching to support plate 112. In the embodiment shown in FIG. 2, the attachment mechanism is a universal joint assembly 228 that is bolted to the support plate 112 by bolts 232. The lower surface of motion plate 112 is attached to the upper end of universal joint 228. Universal joint 228 is coupled to motion plate 112 by a plurality of bolts 232 and a flanged yoke 230 that is part of the universal joint 228 assembly. Yoke 230 carries a set of needle bearings and another set of needle bearings is carried in the slip yoke 100. It should be apparent to one skilled in the art that other means for coupling universal joint 228 to motion plate 112 are known in the art. For example, yoke 230 could be welded to universal joint 228 and to motion plate 112.

Referring again to FIG. 3, the three motors are shown positioned in the preferred orientation with one motor, motor 208L in the front left position, another motor, motor 208R, in the front right position and the third motor, motor 208C, in the rear center position. The two forward motors 208L and 208R control the roll of motion plate 112. Both of these motors are substantially identical in size and symmetrically alignment relative to support plate 108 and motion plate 112. The left and right motors are used together to give the motion platform roll. To roll right, the left motor crank is turned up, and the right motor crank is turned down. For pitch, the left and right motors are driven in the same direction, and the rear motor is driven in the opposite direction from the other two.

To detect the position of each motor 208, the output shaft of the motor is coupled to a pulley 212. Pulley 212 engages belt 213 that, in turn, also engages pulley 304. When the controller drives the motor, rotation of the drive shaft of motor 208 drives pulley 212, which causes belt 213 to transfer the rotational information to pulley 304. Pulley 304 drives a potentiometer 306 that provides feedback information to the controller 211. In alternative embodiments, an in-line potentiometer or other motion sensor device directly coupled to the output of each gearbox 210 may replace the pulley and belt arrangement. Alternatively, the motion sensor may be directly coupled to the drive shaft of each motor 208. The in-line potentiometer removes any latency associated with the belt and pulley arrangement and improves feedback on motor position as well as reduces costs by minimizing the parts count.

The position of support pedestal 110 relative to support plate 108 is also shown in FIG. 3. It is approximately midway between the left and right (that is, the side) edges of support plate 108 and closer to the front portion of support plate 108 than to the rear. Support pedestal 110 is positioned to maintain a center of gravity of the personal simulator system 102 so that when the rider is seated in support structure 106, support plate 108 will not lift or tip. Four support gussets 310 are shown. Gussets 310 extend upward from support base 108 and engage the outer circumference of support pedestal 110. Although only four support gussets 310 are shown, additional gussets may be used to provide additional structural integrity and distribute stress. The height of gussets 310 may vary depending on the application but are about 7.62 cm in the illustrated embodiment. It is important that the height be limited so as not to interfere with the operation of the slip spine. In another alternative, a conical base, rather than support gussets 310, may completely encircle and engage the lower portion of support pedestal 110.

Figure 4:
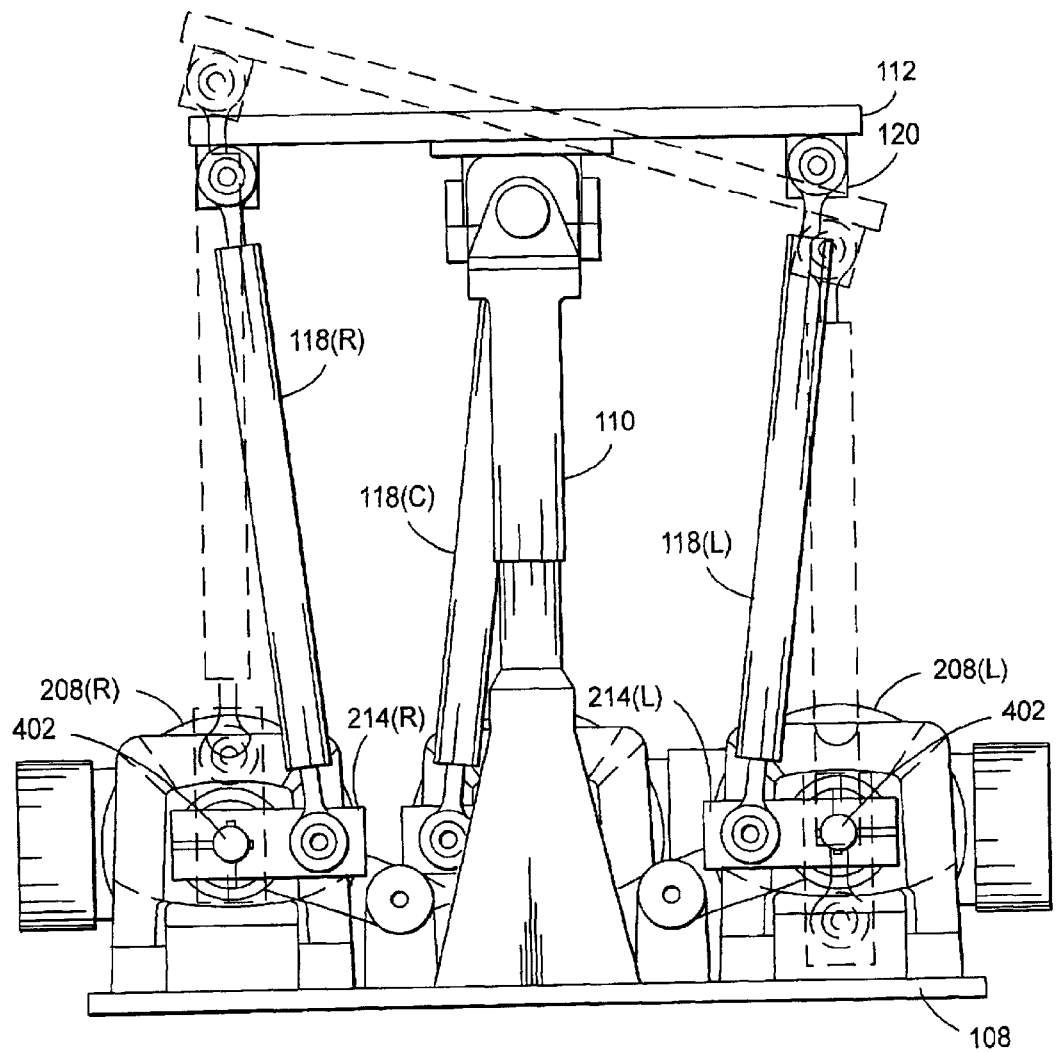
FIG. 4 illustrates a front view of the motion base in a nominal and yawed to the right orientation.

Referring now to FIG. 4, a front view of the motion base 104 is illustrated with motion plate 112 shown in its nominal (that is, horizontal) position. In the nominal position, support plate is substantially parallel to the floor and to support plate 108. It is interesting to note that in the nominal position, the longitudinal axis of each crank 214 is also substantially parallel to support plate 108. Further, in the nominal position, flanges 120 are aligned substantially over the respective drive shaft 402 of each motor. However, because drive arm linkage 118 are coupled to the outer end of crank 214, each linkage 118 is slightly splayed rather than in vertical alignment. Thus, during operation of personal simulator system 102, a roll motion of platform 112 to the left is achieved by rotating the left crank 214L downwards towards support plate 108 while crank 214R rotates upward. As used herein roll refers to motion about a horizontal axis out the front of the motion base. In this manner, motion plate 112 is oriented with an extreme tilt to the left as illustrated with the dashed motion plate and drive arm linkages shown. In the embodiment illustrated in FIG. 4, the pitch and roll motion provides an angle of about "17 degrees although during operation of the personal simulator, smaller angles are preferred—for example about three degrees (3°) to about five degrees (5°). It is understood that varying the length of the cranks associated with the each of the front motors and the height of the drive shaft 402 relative to support plate 108 the amount of maximum roll may be selected as an engineering design choice. It is also possible to provide pitch so that the motion plate 112 turns about a lateral axis such that the front edge of motion plate 112 will either rise or fall in relation to the rear of motion plate 112. Pitch is provided by operation of motor 208C. If the roll or pitch angle of greater than about fifteen degrees (15°) is required for a particular application, motors 208 may need to be attached to an elevated platform to allow sufficient rotation of the cranks 214. Thus, by controlling each of the cranks associated with the left, right and rear motors, it is possible to cause the rider to tilt left or right or pitch forward or rearward. To increase the sensation of a rapid pitch, operation of motors 208L and R in tandem will raise the front edge without any roll while operation of the rear motor 208C lowers the rear edge of the motion plate 112. Also, by operating all three motors in tandem, a heave motion (up or down motion without roll or pitch) is imparted to motion plate 112. The slip spline of support pedestal 110 in the illustrated embodiment enables the support pedestal to extend by about 10 cm as the push rods move upward and return to its nominal alignment as the linkages 118 are lowered.

With the present invention, a safe and inexpensive personal simulator system 102 is provided. The present invention reduces the cost of the personal simulator by using inexpensive electric motor technology. More specifically, commercially available ¼ H.P. to ½ H.P. 220 VAC three-phase induction motors may be used. A controller 211 controls the motors so that operation appearing similar to a DC servomotor is achieved. The controller 211 obtains AC power, such as 120 V AC, from any wall outlet. Controller 211 rectifies and doubles the AC voltage to produce DC and then converts it to a variable frequency, variable voltage 3-phase output with which motors 208 are driven. If external supplied power is 220 VAC, the power input is simply rectified and converted to a variable frequency. As will be apparent to one skilled in the art, AC motors will operate at variable speed in response to the variable frequency provided by the controller 211. In the preferred embodiment, the controller 211 obtains either an analog or digital signals representative of the desired position from an external source. This positional information is converted to a selected frequency and voltage by the controller and applied to the associated motor to control one of the three axes of motion. The positional information is received by the controllers from a signal source, such as a microprocessor, game console, a user-manipulated joystick or other source (by way of example, the Internet) of motion information via an RS232 interface or other network interface.

A significant challenge associated with the use of induction motor technology is control of the motor at low or zero motor speed while maintaining maximum torque. It should be apparent to one skilled in the art that high torque is necessary to provide the forces to move motion platform 112 and up to 300 pounds of weight. This challenge is even more challenging because the preferred embodiment does not use an encoder or an encoder interface card in order to minimize the cost of the personal simulator system. Accordingly, the present invention uses an induction motor with a unique low cost controller interface to provide a volts-Hertz characteristic to the motor where the dynamic boost provides maximum torque at zero and low operating speed. In accordance with the present invention, torque is controlled by the supplied current using a simple voltage/frequency control arrangement for the induction motors instead of other more sophisticated forms of control such as flux-vector control. Motor position is maintained by using the feedback signal derived from the potentiometer to control the amount of boost applied to the motor. The dynamic boost is dynamically applied to compensate for deviation from the target position. The applied boost will vary depending on the horsepower and motor resistance of motor 208. Advantageously, the controller interface further utilizes a bipolar input signal to maintain high motor torque even as the input signal traverses through zero volts. The controller is thus able to drive the induction motors to achieve high torque at low motor speed and to respond to signals representing instantaneous change in direction or speed.

To maintain bipolar operation with a smooth transition through zero (that is, where the motion platform is held in a static position), the present invention utilizes a dynamic boost. The dynamic boost compensates for an induction motor characteristic that as the frequency of operation decreases then the magnitude of the voltage applied to the motor also decreases. By way of example, as the operation of the motor is reduced from 60 Hertz down to approximately 2 Hertz, it is necessary to proportionally reduce the voltage applied to a motor. However, as the frequency of operation approaches zero Hertz, it is important not to reduce the voltage to zero because then the motor will drop the load. Accordingly, as the frequency of operation approaches zero Hertz, the voltage is increased, or boosted, to approximately 25 volts. It is noted that the point at which the dynamic boost is applied to the input voltage is dependent upon the actual motor characteristics and the mechanics that the motor must drive. Accordingly, there is no set frequency of operation where the dynamic boost is applied and it must be an engineering selection based on system requirements for a particular application.

The personal simulator of the present invention use two types of boost, static and dynamic to control the fractional horsepower motors. Static boost is commonly used to control Volts-Hertz motors. Static boost means that the V/f curve doesn't go through zero volts at zero Hz, but rather has some non-zero voltage (usually around 25 volts) at zero Hz so that the motor can generate torque at low frequency. If the V/f curve had zero volts at zero Hz, the motor torque would necessarily be zero. This is a brute force method of generating torque at low frequency as compared to a more expensive method using a flux vector drive and an encoder on the motor shaft because an encoder costs about $150 in low quantities, and flux vector drives are more expensive than V/f drives.

Dynamic boost refers to a phenomenon where the boost voltage momentarily increases during a transient (either positive or negative) input to the drive. When it is necessary that the motor accelerate, the control input to the drive will change value. Passing this changing input to the drive through a high pass filter and then taking the absolute value of the filter output will yield a signal that is used to increase the boost and increase the available motor torque during the acceleration or deceleration.

Figure 5:
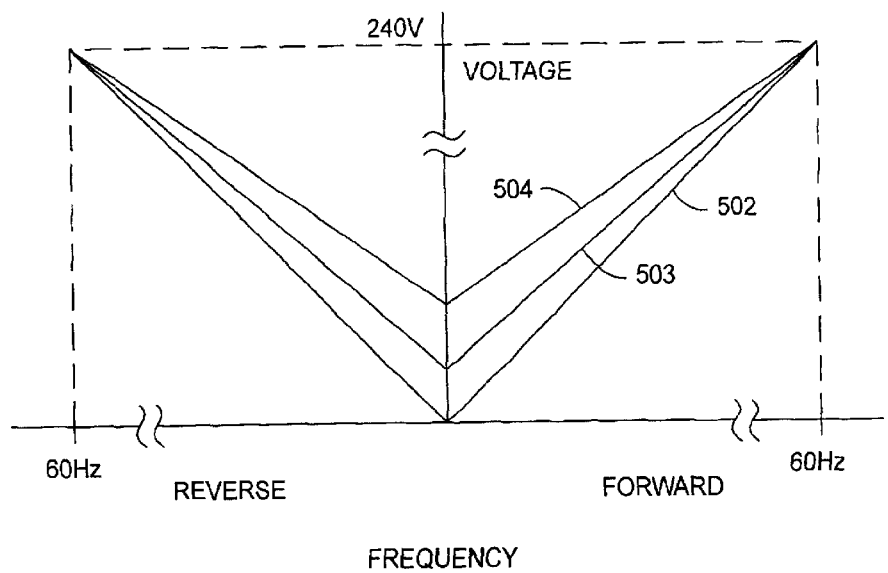
FIG. 5 illustrates a dynamic boost voltage.

The concept of the dynamic boost is illustrated in FIG. 5. As illustrated, when no dynamic boost is required, the volts/hertz curve 502 forms a chevron-like pattern with a positive-going line extending from the origin to the 240 V-60 Hz point in the forward direction. Likewise, the negative-going line extends from the origin to the 240 V-60 Hz point in the reverse direction. When dynamic boost is required, the slope of the curve 502 decreases as the boost voltage increases at lower frequencies as illustrated by curve 503. When additional dynamic boost is called for, the slope may be further reduced as illustrated by curve 504. As used herein, dynamic boost refers to a change in the volt/frequency ratio in response to position change or to maintain torque at low or zero frequency. As the positional error increases, the dynamic boost will correspondingly increase. The amount of boost is dynamically varied which means that a boost is applied by control software and it is not necessarily limited to the discrete values illustrated in FIG. 5.

Dynamic boost is applied in response to transient motion where additional voltage is required to accelerate or decelerate the personal simulator system 102. The amount of the boost and the duration for which it is applied is determined in part by the duration of the transient, and in part as an engineering selection, that must be determined based on the motor and the mechanical time constants associated with the personal simulator system 102. By way of illustration, if the motor is accelerated for a short duration, the dynamic component of the boost will be applied for the same duration. Dynamic boost is also applied when one of the motors is held in a static position and the applied frequency is about zero Hertz. When operation of the motor is static, the dynamic boost voltage (25 V) will be applied for the entire duration. In order to detect when a dynamic boost is required, the present invention includes a lead network, such as a high pass filter, associated with the motor controller that detects transient motion and static conditions and generates the boost at the appropriate time. The high pass filter determines the amount of boost to apply in response to the required rate of change and the magnitude (amount) of change required to achieve the required position of motion platform 112. The additional boost (e.g. to 50 V) is applied as a step function with a boost decay period of several tenths of a second. Decay of the boost voltage is determined by the time constant of high pass filter. In a typical application, the dynamic boost signal will vary from about 25 volts to about 50 volts in order to achieve the necessary current to maintain torque at current operating frequencies.

Figure 6:
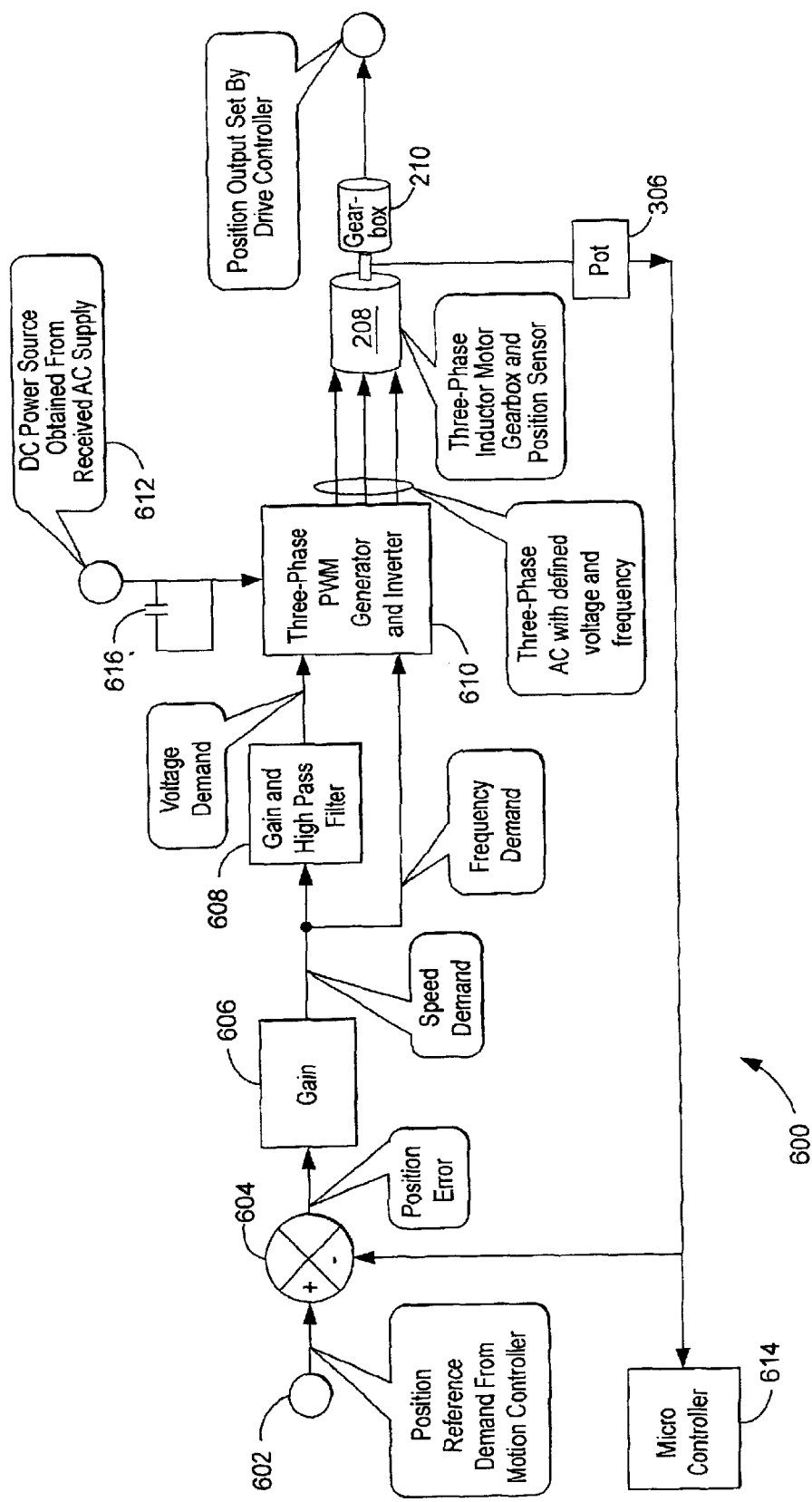
FIG. 6 illustrates a schematic diagram for one axis positional control for the personal simulator of the present invention

Referring now to FIG. 6, a schematic diagram for one axis positional controller (APC) 600 for the personal simulator system 102 of the present invention is shown. It should be understood that personal simulator system 102 includes one such positional controller for each axis of motion. As illustrated at terminal 602, a motion control signal conveying positional information, generated from either the joystick or an externally generated simulation event, is received. Preferably, the motion control signal is digital rather than an analog signal. This signal is combined at summer 604 with a signal indicative of the current orientation of the motion platform generated by the potentiometer 306. To guarantee that there is smooth motion through the zero point (see FIG. 5), summer 604 includes a bipolar switch or flip/flop that direction of motion required to achieve the desired position of motion plate 112. Summer 604 also includes a circuit for converting the analog signal generated by potentiometer to a digital signal. The output of summer 604 provides a position error showing the direction and magnitude of change required for the motion base. Amplifier 606 provides a selected amount of gain to scale the position error and to provide an adequate noise margin. This amplified signal is then split and further amplified by amplifier and filter circuit 608 to generate a magnitude signal indicative of the voltage demand. Amplifier and filter circuit 608 includes a high pass filter eliminates high frequency noise and provides a voltage demand signal indicating the dynamic boost. The corner frequency of the high pass filter is an engineering selection but in one embodiment is selected to filter out signal components above 60 Hertz.

As noted above, the amplifier and filter circuit 608 generates the dynamic boost. The filter implementation provides a time constant of about two (0.2) seconds in that when a positional signal requires a step change in position of motion plate 112, the boost voltage will instantly increase with the magnitude of the increase proportional to the step change amplitude. The boost voltage will decay back to the original value within about three time constants.

The output amplifier and filter circuit 608 is provided as a voltage reference to a first input of a three-phase pulse width modulator generator and inverter 610. The other output of amplifier 606 is provided as a frequency demand reference to a second input of the generator and inverter 610. DC power source 612 rectified and doubled supplied 120 volt AC power to provide at least 340 volts of DC power. Voltage doubler circuits are well known in the art.

The output of generator and inverter 610 is a three-phase AC signal with an output voltage and frequency proportional to the rate of change and direction the motion platform is to move and the demanded rate of change. This AC signal is supplied to the associated one of the induction motors 208 (see FIG. 2). Feedback potentiometer 306 generates signals to control the induction drive via microcontroller 614 without the need for an encoder. In response to the applied signal, the motor drives the gearbox 210 with potentiometer 306 providing a negative feedback signal of the position to summer 604. When the motion platform is correctly positioned, the feedback signal will match the motion control signal and the motors, and correspondingly the motion of motion platform, will stop. Thereafter, a static boost voltage is applied to maintain motor torque at a zero frequency (or a low frequency sufficient to provide enough torque to hold the motor and platform stationary regardless of the load). Potentiometer 306 is also monitored by microprocessor 706.

Figure 7:
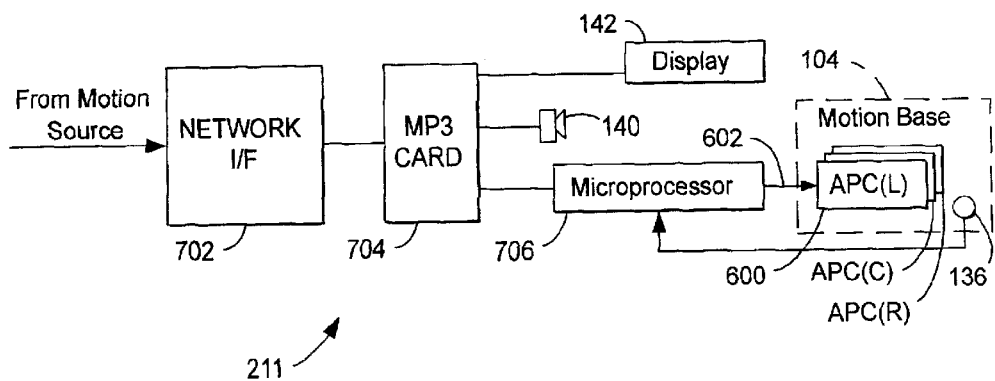
FIG. 7 is a system block diagram of the personal simulator.

Refer now to FIG. 7 where controller 211 is further illustrated. In addition to APC 600, controller 211 includes an RS-232 or network interface circuit 702 although any transmission protocol could be used. For example, an infrared, Internet or Ethernet transmission protocol could be readily adapted to interface the controller to the motion source. In other embodiments, a home area network such as commercially available from Intel Corporation, or telephone cable signaling, Universal Serial Bus (USB), radio frequency or Bluetooth communication protocol for PC-to-PC communication. The motion commands could also be received from a dedicated game computer such as Nintendo, Sega or PlayStation2 available from Sony Corporation. An MP3 card 704 receives the motion command. MP3 card 704 routes the audio signal to speakers 140 and video signals to display 142. In another embodiment, the MP3 card may be omitted if the positional information is provided from the joystick or the external source in digital form. Typically, the MP3 card 704 is a part of microprocessor 706.

Motion commands are received by microprocessor 706 and passed to microcontroller (within each motion base axis) that, by way of example, may be the Infineon SABC504 single chip microcontroller. Microcontroller 614 is responsible for determining which axis of motion needs to be adjusted in response to the detected motion command. This determination is made by first recovering the embedded motion commands and using a lookup table to translate the command to a positional signal. Thereafter, microcontroller 614 monitors operation of each axis of operation and performs any safety checks such as determining whether the motion commands are requesting a rate of change or a position that exceeds preselected safety limits. Microcontrollers (within each motion base axis) are responsible for detecting when to apply a dynamic boost. When a dynamic boost is required, microcontroller for each motion base axis generates the appropriate input signal within 608 of APC 600. So that motion of personal simulator matches the displayed image, microprocessor synchronizes the motion to the displayed images taking into account the time constants of personal simulator and any lag factors that may arise from inertia etc. Lag factors and time constant calculations are engineering factors that are implementation dependant. Where motion control signals are supplied by motion source, the sequence of motion can be downloaded in advance of the video and audio transmission together with timing information. Alternatively, the video and audio transmission may include simultaneously transmitted embedded tags indicating that motion is required. In this manner, microcontroller 614 can perform the necessary calculations and supply the positional information to APC 600 upon receipt of each tag. Thus, the signal supplied by the motion source does need to be concerned with the lag factors and time constants for each personal simulator system 102.

In another preferred embodiment, a dedicated microprocessor is provided for each APC 600. Since each motor operates independently, the microcontrollers need not be linked. However, each microcontroller 614 may receive and monitor the positioning information obtained from the potentiometers 306 associated from the other APC 600.

Figure 8:
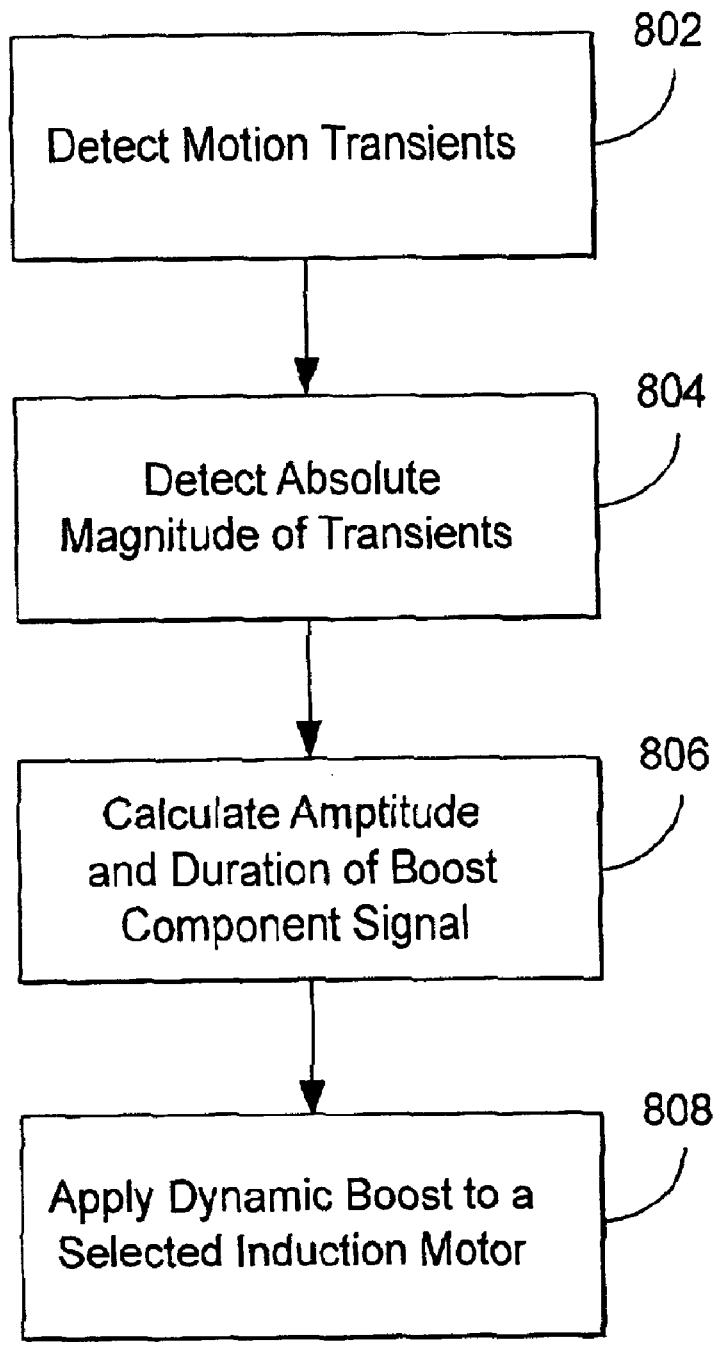
FIG. 8 illustrates the operating sequence for the personal simulator.

Referring now to FIG. 8, an algorithm for the dynamic boost is illustrated. This algorithm is executed by the controller in response to a movement transient or static motion of the motor. In step 802, transients coming in a future period are detected by microcontroller (within each motion base axis). In step 804, the absolute magnitude of the transient is determined. Accordingly, it does not matter if the transient is positive-going or negative-going. Based on the detected amplitude, in step 806, the amplitude and duration of a positive dynamic boost component signal is calculated based on the current motor speed and position. In step 808, the dynamic boost signal is applied to the motor 208.

In order to slow the motor down from a high rate of speed to a slow rate of speed, the dynamic boost may need to be increased in terms of both voltage and duration. This is required because slowing the mechanical motion of motion plate 112 (and the associated mass) requires additional torque. Further, when the induction motor is operating at a slow speed or is static, the dynamic boost is critical to maintaining sufficiently high torque. In a similar manner, when it is required to increase the rate of speed of movement of the motion plate 112, the dynamic boost component must be increased in order to increase torque and to maintain load capacity.

To aid in slowing the motion plate, DC capacitor 616 is coupled to across the positive and negative terminals of the output of the DC power source. Capacitor 616 enables the controllers to work without tripping due to an over-voltage condition during rapid deceleration of one or more of the motors. In this case, energy from the motor is fed back into the DC power supply. Without sufficient capacitance, this energy would otherwise cause the motor to trip and shutdown suddenly. Thus, in one preferred embodiment, inverters 610 are each driven by a common DC power source that provides a sink for the regenerative energy to be dissipated without tripping the controllers and causing the simulator to function in a non-linear manner.

Figure 9:
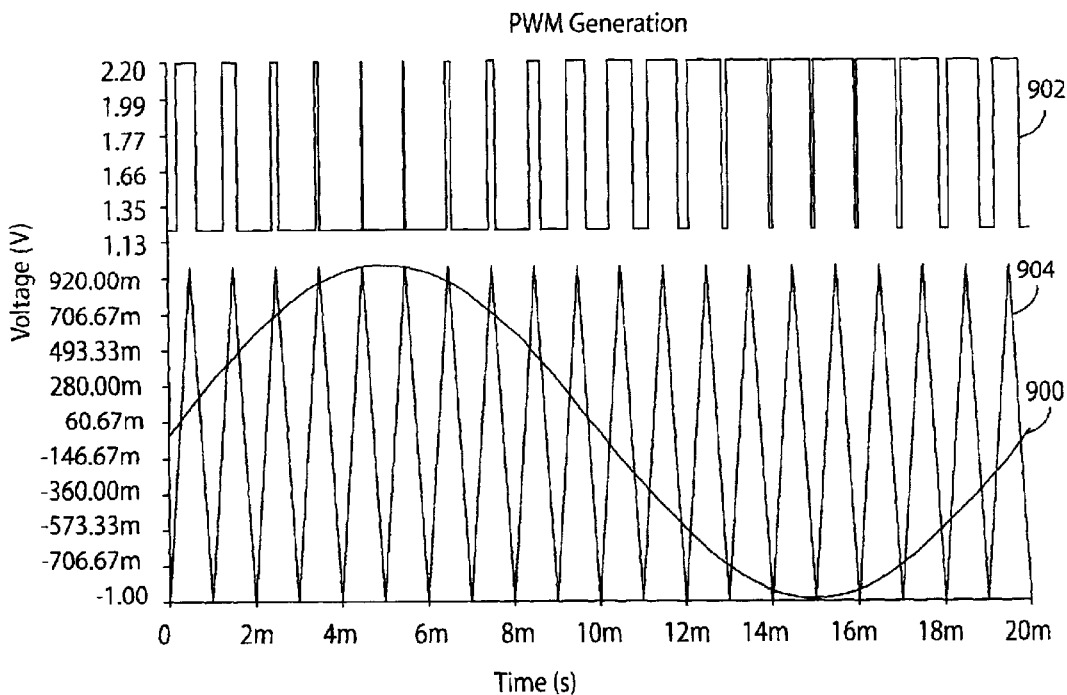
FIGS. 9 and 10 illustrate the drive voltage waveform used to control the operation of the fractional horsepower motors.
Figure 10:
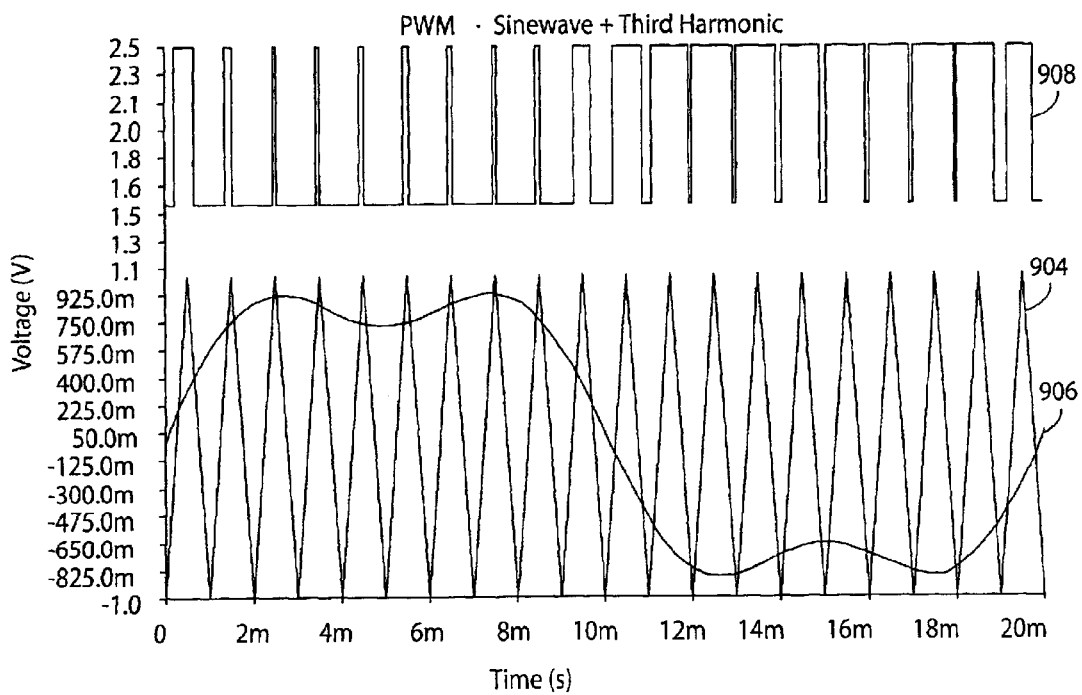

FIGS. 9 and 10 illustrate the conversion process for generating a pulse width modulated control signal that drives each of the induction motors. In FIG. 9, a sine wave 900 of about 50 Hz is shown for purpose of illustration. In general, sine wave 900 is converted to the pulse width modulated pulse train 902 with the width of each pulse determined by a triangular sampling signal 904. The intersection of sine wave 900 and signal 904 determines the width of pulse train 902. In FIG. 10, a sine wave plus third harmonic 906 is used to generate the drive control signal 908. For a three-phase induction motor, all phases have the same third harmonic content and the motor does not respond to the third harmonic. However, the third harmonic enables a higher fundamental voltage to be applied to the motor from the rectified DC voltage. In one preferred embodiment, a commercially available Intelligent Power Module (IPM) chops the DC voltage to drive six switches that control each motor with three-phase AC with variable voltage. One such IPM is the sold under the Powerex trademark. Each motor averages the PWM power so that operation is equivalent to a three-phase sine wave power signal. Waveform 906 is applied to one winding while similar waveforms with a different phase are applied to the other windings. When dynamic boost is applied to the windings, the applied voltage to each winding is held constant for the duration of the applied dynamic boost. Thus, one winding may have a positive voltage applied, another winding may have a negative voltage applied while the third winding, by way of example, may have zero voltage applied.

Figure 11:
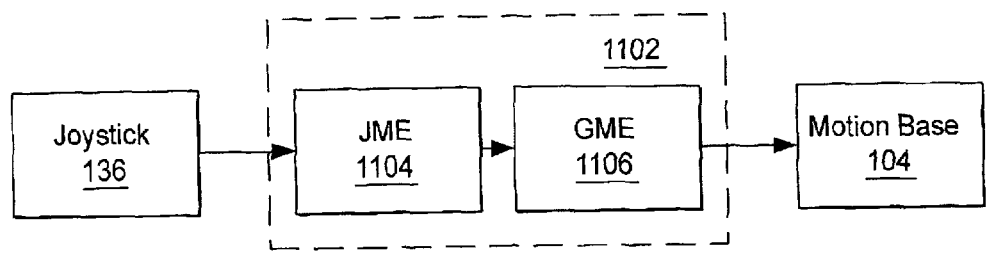
FIG. 11 illustrates an embodiment of personal simulator system in accordance with the present invention incorporating a game motion engine for direct control of the motion base by a user.

Referring now to FIG. 11, illustrates another embodiment of personal simulator system 102 having a game motion engine 1102. In this embodiment, motion commands are synthesized from simple commands generated by user 133 using joystick 136 (see FIG. 1). Output from joystick 136 is detected by Joystick Motion Interpreter (JMI) 1104. JMI 1104 is a software program operating on microprocessor 706 that directly interfaces with the joystick. JMI 1104 allows remote user 133 to define motion movements for a particular game that are then sent to a Game Motion Engine (GME) 1106 for interpretation and processing. Preferably, GME 1106 is also operating on microprocessor 706. GME 1106 interpolates data from JMI 1104 into drive commands for motion base 104. These commands cause the motion base to move per the JMI position data and programmable data table. Thus, with the user in direct control PC-based game, no data is required from the game because all motion is either pre-programmed or direct, real-time, joystick data. More specifically, using the input from joystick 136, GME 1106 generates axis specific commands to produce motion such as "turn and heave", "turn and go up", "turn and go down", "turn and vibrate", "turn and jump", "turn and accelerate", "turn and drop". Other motions can similarly be incorporated into any game without requiring the game to include embedded motion control signals. Once the data is processed by GME 1106, commands are sent to the appropriate port to motion base 104. Supported ports include Ethernet ports, serial ports, parallel ports, infrared ports, fire wire ports, or USB ports all of which are known in the art.

In other instances, the game environment may include a game box 1202 such as the Nintendo64 or Gamecube available from Nintendo, Playstation available from Sony Corporation, X-Box available from Microsoft Corporation or Dreamcast available from Sega. In such instances, the output of the game box is passed through GME 1106 before it is displayed on display 142 (FIG. 1). GME 1106 interprets the data coming from the game box and converts the action into the appropriate motion.

Figure 12:
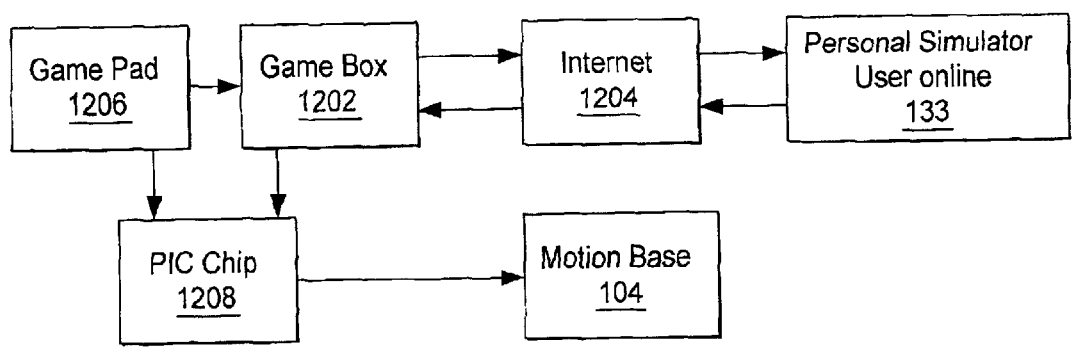
FIG. 12 illustrates an Internet game environment.

Referring now to FIG. 12, an Internet game environment is illustrated. In this environment, game box 1202 is coupled to a remote user by an Internet connection 1204. As indicated, this coupling permits bi-direction communication so that the environment is a result of collaboration between the remote user and user 133. It is to be understood that the remote user is not to be limited in terms of the number of such remote users.

Game box 1202 is also coupled to a game pad 1206 by a cable or RF connection, by way of example. A second coupling mechanism couples game pad to a programmable interface controller PIC chip 1208. PIC 1208 interprets the signals coming from game pad 1206 and performs the necessary interpolation to generate motion commands used to drive motion base 104. PIC 1208 contains the motion interpretation code of GME 1106 as firmware to allow rapid translation. Preferably, the motion interpretation code is stored in flash memory or other random access, non-volatile memory. PIC 1208 is also coupled to game box 1202 to enable the motion base to receive motion data from the game box that includes data from the remote Internet player and feedback data from the game itself. As an example of Internet game play: players are playing an online battle game such that when one opponent strikes another the chair of the struck opponent moves. This motion could, by way of example, be a slight "jerk" motion of the chair that emulates the effect of a bullet hit or a larger, more forceful "jerk" motion for a crash. A set of specific motions for possible motion is programmed into the PIC chip so that the task of generating appropriate motion commands become a task of selecting from a plurality of available motions. Thus, when PIC 1208 receives a command for a particular type of movement, PIC 1208 quickly interprets the command and moves the support platform 112 and chair 106 (see FIG. 1) accordingly.

In operation, game box 1202 generates a series of linked scenery images that are displayed for viewing by the rider and transmitted to remote players. The rider on the motion base uses game pad 1206 for generating rider input to control the motion base 104. PIC 1208 converts this control information to motion commands for motion base 104. Further, motion commands may be received from the remote users over the Internet 1204 or other communication network. Thus, the motion base 104 may be moved in response to motion commands generated by the remote players. This information may be received by game box 1202 either as embedded motion control signals or in response to changes in the scenery images it being understood that video games comprise a series of linked scenes that may change in a linear fashion such as if an avatar were to drive a car along a narrow curvy road. These changes in the scenery are detected and then converted into motion control signals.

In yet another embodiment, a Movie Motion Engine (MME) replaces GME 1106 and receives embedded motion data and translates it into motion commands to drive the motion base. The motion commands queue in memory associated with MME and are synchronously displayed with the movie images. The motion command queue is digitally embedded into the movie using a motion mastering process and stored on an unused audio track. This audio track delivers the motion data to the right audio channel that is connected to an audio motion input (not shown) associated with motion base 104.

In yet another embodiment, a Sports Motion Engine (SME) replaces GME 1106 and receives embedded motion data and translates it into motion commands to drive the motion base. This motion interface allows rider 133 to experience sports such as NASCAR, World Cup ski racing, and flying events being displayed on television or over the Internet. A data gyro and an accelerometer are placed on the vehicle and transmitted by radio. The data gyro transmitter (RF signal generator) sends signals to a motion control receiver that decodes the motion data and passes it to an Internet website. At the web site, the game box connects to the website, the motion data is downloaded and processed by the PIC controller with an onboard modem and Ethernet port. The SME decodes the signal data into Ethernet motion data to drive the motion base. The motion transferred to the motion base thereby very closely simulates the motion of the vehicle including any associated vibration.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed.

We claim:

1. A personal simulator system having a display device for displaying simulated scenery depicting motion; said system comprising:

A motion control device for indicating a desired change in the position of said system;

A support plate;

A pedestal support rigidly connected to said support plate at one end and having a coupling joint at the other end;

A motion plate for supporting a rider, said motion plate coupled to said coupling joint;

A plurality of AC fractional horsepower motors fixedly mounted on said support plate:

A plurality of drive arm linkages, each coupled at one end to a respective one of said plurality of AC fractional horsepower motors and, at the other end, to said support plate; and A controller for generating a motor control signal to cause each of said plurality of AC fractional horsepower motors to cooperatively either reposition said motion plate by changing the relative orientation of at least one of said drive arms with respect to at least one other drive arm or for generating a dynamic boost motor control signal to maintain the current position of said at least one drive arm, said controller responsive to a positional control signal generated by said motion control device and having means for increasing motor torque at zero speed.

2. The personal simulator of claim 1 further comprising a chair coupled to said motion plate, said chair having an internal sneaker to generate sound and chair vibrations.

3. The personal simulator of claim 2 wherein said support plate comprises an aluminum support plate having a ballast chamber.

4. The personal simulator of claim 3 wherein said controller comprises:

Means for generating a three phase variable voltage pulse width modulated signal for driving each of said motors where each phase is applied to a different winding of each of said AC fractional horsepower motors; and A DC power supply having a sink for dissipating regenerative energy during rapid deceleration of one or more of said motors.

5. The personal simulator of claim 4 wherein said controller further comprises means for increasing motor torque at low speed by holding the applied voltage to each winding of each of said motors constant for the duration of the applied dynamic boost.

6. The personal simulator of claim 1 wherein said plurality of drive assemblies comprise a first and a second drive assembly coupled proximate to respective first and second adjacent corners of said motion plate and a third drive assembly coupled midway between adjacent corners opposite from said first and second adjacent corners.

7. The personal simulator of claim 1 wherein said plurality of drive assemblies comprise at least three drive assemblies connected to said support plate in a generally triangular configuration.

8. The personal simulator of claim 1 wherein said pedestal support is coupled to the center of said support plate and said plurality of drive assemblies comprise at least three drive assemblies connected to said support plate in a generally triangular configuration proximate to the periphery of said support plate.

9. The personal simulator of claim 1 wherein said support plate comprises a rigid metal plate capable of supporting a static load of at least 300 pounds.

10. The personal simulator of claim 9 wherein said support plate further comprises ballast.

11. The personal simulator of claim 10 wherein said drive arm linkage further comprises:
   A lower eyebolt;
   A first rod end connector, connected to said lower eyebolt, for rotatably coupling said drive arm linkage to said crank;
   An upper eyebolt;
   A second rod end connector, connected to said upper eyebolt, for rotatably coupling said drive arm linkage to said motion plate; and
   A rigid push rod connecting said upper eyebolt to said lower eyebolt.

12. The personal simulator of claim 11 wherein said motion plate comprises:
   A flange coupled to said upper eyebolt by said second rod end connector; and
   Means for coupling said motion plate to said universal joint.

13. A single person motion simulator comprising:
   A display device for displaying a video signal;
   Means for supporting a person proximate to said display device;
   Means for receiving and interpreting motion commands;
   Means, responsive to said receiving and interpreting means, for positioning said support means in at least three axis of motion synchronized with said video signal, said positioning means including at least three fractional horsepower AC motors coupled to said supporting means for controlling said three axis of motion;
   An enclosure surrounding said support means and said control means;
   A controller that receives motion control signals and, responsive to said motion control signals, generates a three phase variable voltage pulse width modulated signal for driving each of said motors and for maintaining torque within a selected range while operating said motors at low operating speeds; and
   A DC cower supply having a sink for dissipating regenerative energy during rapid deceleration of one or more of said motors.

14. The single person motion simulator of claim 13 wherein said support means comprises a chair having an internal speaker to generate sound and chair vibrations.

15. The single person motion simulator of claim 14 wherein said support means further comprises an aluminum support plate having a ballast chamber.

16. A simulator system having a platform for positioning a rider and for displaying audio and video signals to said rider, said simulator system comprising:
   Computer means for generating said audio and video signals and motion control information synchronized with said audio and video signals;
   A motion platform including:
      Linkages, coupled to said motion platform, for controlling the pitch, roll and heave of said motion platform;
      A plurality of induction motors, coupled to said linkages for controlling said linkages;
      A controller, associated with each motor, coupled to said computer means and adapted to receive control information from said computer means, said controller, in response to said control information, adapted to generating motor control signals to position said motion platform; said controller further adapted to generating a dynamic boost signal for maintaining torque within a selected range while operating said motors at low or zero operating speeds; and
   A DC power supply having a sink for dissipating regenerative energy during deceleration of said motors.

17. The simulator system of claim 16 wherein each of said induction motors comprises a fractional horsepower AC motor.

18. The simulator system of claim 17 wherein said controller generates a pulse width modulated signal having a variable AC voltage and variable frequency for controlling said fractional horsepower AC motors.

19. The simulator system of claim 17 wherein said controller is adapted to selectively increase the torque of said fractional horsepower AC motors.

20. A personal simulator system for spatially positioning a rider and for displaying audio and video signals to said rider, said simulator system comprising:
   A motion platform supported by a pedestal and a plurality of linkages, said motion platform adapted to receive and retain said rider in proximity to said displayed audio and video signals;
   Means for controlling a plurality of induction motors to, coupled to said linkages, to position said motion platform responsive to and synchronized with the displayed audio and video signals; said controlling means adapted to maintain torque of said induction motors within a selected range while operating said induction motors at low operating speeds; and
   A DC power supply having a capacitor for dissipating regenerative energy during rapid deceleration of said motion platform.

21. The personal simulator system of claim 20 wherein said controlling means further comprises means for increasing motor torque at zero or low speed by applying a DC voltage of between ±25 volts to about ±50 volts to at least two windings of each of said induction motors.

22. The personal simulator system of claim 20 wherein said controlling means further comprises:
   A plurality of controllers, each of said controller dedicated to an axis of motion of said motion platform, for receiving a positional reference and calculating the difference between the current position of said motion platform and the positional reference, said controller determining the rate of change necessary to achieve said positional reference;

A plurality of fractional horsepower AC motors, each coupled to one of said plurality of controllers for generating torque for changing and maintaining the position of said motion platform; and Means for coupling said plurality of fractional horsepower AC motors to said plurality of linkages.

23. A personal simulator system for spatially positioning a rider and for displaying audio and video signals to said rider, said simulator system comprising:

A motion base;

A chair attached to said motion base, said chair having an internal speaker to generate sound and chair vibrations;

A motion control device;

Means, coupled to said motion base and said motion control device, for controlling the positioning of said motion base in response to commands generated by said rider, said controlling means adapted to receive motion control signals from said motion control device and, responsive to said motion control signals, generating a three phase variable voltage pulse width modulated signal for driving each of a plurality of induction motors and for maintaining torque of said induction motors within a selected range while operating said induction motors at low operating speeds; and A DC power supply having a sink for dissipating regenerative energy during rapid deceleration of one or more of said motors.

24. The personal simulator system of claim 12 wherein said controlling means comprises:

Means for detecting a motion request generated by at least one of the following: a joystick, a steering wheel, an accelerator, a motion detector, the Internet, a multiplayer video game or a video camera detector; and Means for converting detected motion requests to motion commands, said converting means coupled to said motion base.

25. The personal simulator system of claim 24 wherein said motion base comprises a two-axis motion base where each axis is controlled by a fractional horsepower electrical motor.

26. The personal simulator system of claim 24 wherein said motion base comprises a three-axis motion base where each axis is controlled by a fractional horsepower electrical motor.

27. The personal simulator system of claim 24 wherein said motion base comprises a four-axis motion base where each axis is controlled by a fractional horsepower electrical motor.

28. The personal simulator system of claim 24 wherein said motion base comprises a four-axis motion base where each axis is controlled by a fractional horsepower electrical motor.

29. The personal simulator system of claim 24 wherein said motion base comprises a five-axis motion base where each axis is controlled by a fractional horsepower electrical motor.

30. The personal simulator system of claim 24 wherein said motion base comprises a six-axis motion base where each axis is controlled by a fractional horsepower electrical motor.

31. The personal simulator system of claim 23 further comprising:

A game box for generating a game where a series of linked scenery images are displayed, said game box coupled to a plurality of remote players and to said motion base;

A game pad for generating rider input associated with said game generated by said game box; and A programmable interface circuit, coupled to said game pad and to said game box for converting changes in said plurality of linked scenery images to motion and for controlling said motion base to track the changes in said linked scenery images.

32. The personal simulator system of claim 31 wherein said motion base comprises a two-axis motion base where each axis is controlled by a fractional horsepower electrical motor.

33. The personal simulator system of claim 31 wherein said motion base comprises a three-axis motion base where each axis is controlled by a fractional horsepower electrical motor.

34. The personal simulator system of claim 31 wherein said motion base comprises a four-axis motion base where each axis is controlled by a fractional horsepower electrical motor.

35. The personal simulator system of claim 31 wherein said motion base comprises a four-axis motion base where each axis is controlled by a fractional horsepower electrical motor.

36. The personal simulator system of claim 31 wherein said motion base comprises a five-axis motion base where each axis is controlled by a fractional horsepower electrical motor.

37. The personal simulator system of claim 31 wherein said motion base comprises a six-axis motion base where each axis is controlled by a fractional horsepower electrical motor.

* * * * *